(No Model.)
J. W. LAYNE.
FISHING APPARATUS.
No. 578,248. Patented Mar. 2, 1897.
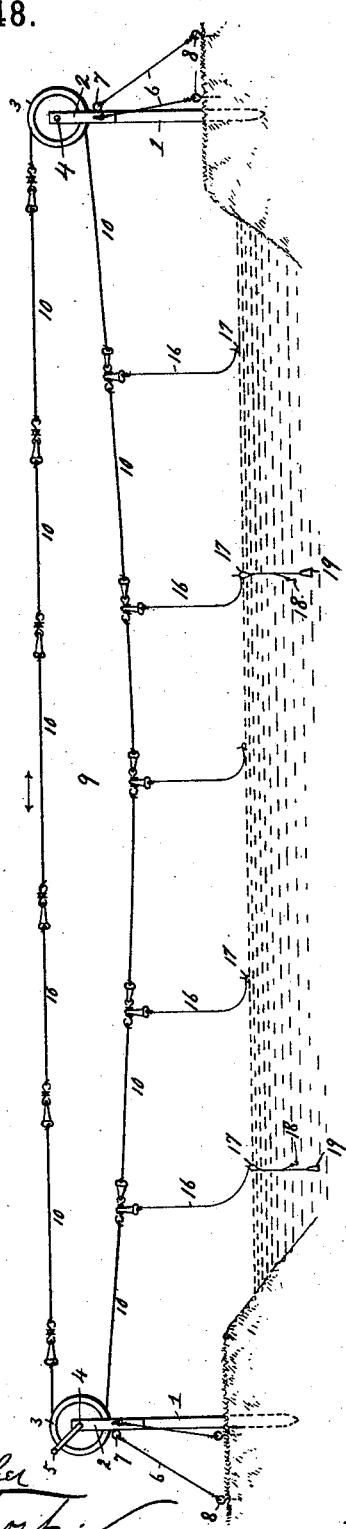
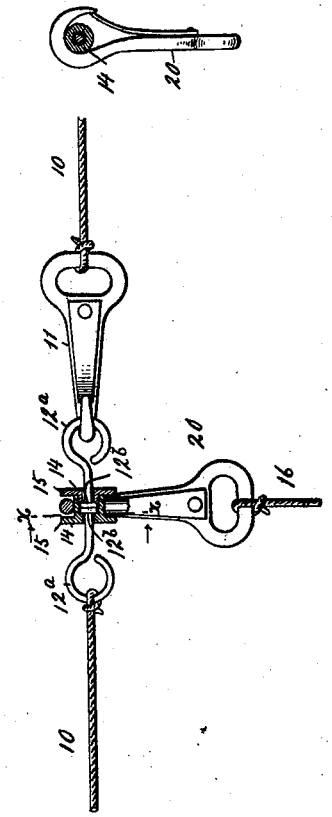
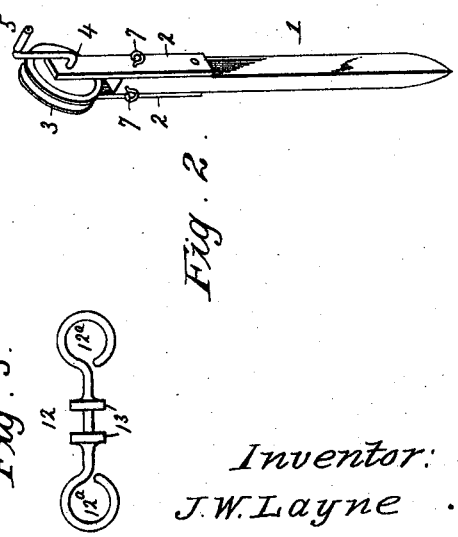
Witnesses:
F. G. Fischer
G. J. Thorpe
Inventor:
J. W. Layne
By Higdon & Higdon
Attys.

UNITED STATES PATENT OFFICE.

JOSEPH W. LAYNE, OF HIGGINSVILLE, MISSOURI, ASSIGNOR OF ONE-HALF TO DANIEL HOEFER, OF SAME PLACE.

FISHING APPARATUS.

SPECIFICATION forming part of Letters Patent No. 578,248, dated March 2, 1897.

Application filed June 26, 1896. Serial No. 597,055. (No model.)

*To all whom it may concern:*

Be it known that I, JOSEPH W. LAYNE, of Higginsville, Lafayette county, Missouri, have invented certain new and useful Improvements in Fishing Apparatus, of which the following is a full, clear, and exact description, reference being had to the accompanying drawings, forming a part thereof.

My invention relates to fishing apparatus or tackle; and my object is to produce a multiple fishing-line which may be conveniently and easily stretched from one side of a stream, pond, lake, or river and may be easily operated or handled by a single attendant at one end of the line.

The invention consists in certain novel and peculiar features of construction and combinations of parts, as will be hereinafter described and claimed.

In order that the invention may be fully understood, I will proceed to describe it with reference to the said accompanying drawings, in which—

Figure 1 represents a fishing apparatus or tackle embodying my invention and in operative position with reference to a body of water. Fig. 2 represents a detail perspective view of one of the pulley-carrying stakes which support the ends of the line. Fig. 3 is a view, partly in elevation and partly in section, to illustrate more clearly the detail construction of the parts of the apparatus. Fig. 4 is a section taken on the line $x\ x$ of Fig. 3, and Fig. 5 is a detail view of one of the double-eye links employed in the construction of the fishing-line.

Referring to the drawings in detail, where similar numerals refer to corresponding parts, 1 1 designate stakes which are driven firmly into the ground at suitable points on opposite banks of a river or other body of water, and said stakes are preferably provided at their upper ends and sides with the metallic plates 2. Between the latter are arranged the comparatively large grooved pulleys 3, mounted rigidly but yet detachably upon the shafts or axles 4, journaled in the upper ends of said bearing-plates, and one of said shafts or axles is preferably provided with a crank-handle 5, by means of which the corresponding pulley may be operated. Said stakes are braced in their vertical positions by means of the series of guy-ropes 6, attached at their upper ends to eyebolts 7 or equivalent devices carried by the stakes and plates 2 and at their lower ends to pins or equivalent devices 8, driven into the ground in the customary manner.

9 designates the fishing-line, which is of endless form, being constructed of a number of sections 10, preferably of varying lengths, for an object to be presently pointed out. The number of said sections also may vary as occasion—that is, the width of the body of water—may demand. Each of said sections will preferably carry at one end an ordinary snap-hook 11 and at its opposite end what I term a "double-eye" link 12, said link terminating at each end in an eye $12^a$. The shank or body of said link will also preferably be provided at a suitable distance apart with enlargements 13, either integrally formed or fixed thereto, for a purpose which will hereinafter appear, or I may construct said double-eye links in two sections, each terminating at its outer end in an eye $12^a$ and at its inner end in a head or enlargement $12^b$, and swivel said sections together by means of the surrounding or embracing collars 14, which are screwed together, preferably, and said collars are provided with the outwardly-projecting flanges 15, corresponding in position and in function to the enlargements or flanges 13, hereinbefore referred to.

16 designates a series of drop-lines, which are provided with the customary floats 17, hooks 18, and sinkers 19 to hold the baited hooks below the surface of the water. The depth to which they may be submerged is regulated by adjusting the floats upon the drop-lines in the customary manner. The opposite ends of said drop-lines are attached to snap-hooks 20, which loosely embrace said double-eye links between the enlargements or flanges 13 of the link shown in Fig. 5 and 15 of the swivel-link shown in Fig. 3, the object being to provide a connection which is positive and reliable and which at the same time cannot possibly permit the drop-line to roll or wind upon the endless or "bridge" line. This obviously is prevented owing to the fact that the snap-hooks 20 embrace said double-eye links loosely at their middle and, furthermore, because they are prevented from slipping longitudinally upon said links by reason of the guard-flanges 13 or 15. If said guard-flanges were not provided, it is obvious that they might slip longitudinally upon the links and become wedged upon them where they are bent outwardly to form the eyes, and therefore in case the line became twisted would cause the drop-line to wind around the bridge-line. As arranged, however, they will always depend vertically from such line and cannot possibly become entangled with it.

While I have shown two forms of double-eye links, I prefer that shown in Fig. 5, because it is the simplest and the cheapest. The other form, however, has one advantage over the form shown in Fig. 5 in that in case one section becomes twisted the adjacent sections will not be affected, owing to the fact that one section of the swivel-hook may turn and not the other. It is to be understood also that while I have described said lines as being provided at one end with a double-eye link and at the other with a snap-hook each alternate section may as well be provided at its opposite ends with two links or two snap-hooks, and it is obvious that other arrangements may be made to accomplish the same result, that is, to provide a line from which a section may be easily removed or into which a new section may be easily and readily coupled, accordingly as the line is to be diminished or increased in length. The sections are preferably made of unequal lengths, so that the length of the bridge-line as a whole may be more readily varied than it could be if the sections were of uniform length and also because if the line be slack one section may be easily removed and a shorter section substituted, or, if too tight, one section removed and a longer one substituted without affecting the positions of the stakes.

In practical operation the first drop-line, or the one which will be farthest from the bank on which the operator stands, is baited and snapped upon one of the double-eye links, as described. The crank-handle is then turned in the proper direction to feed the line outwardly until the next double-eye link comes opposite the operator. He then baits and snaps on the next line, and this operation is repeated until all of the drop-lines which he desires to employ are disposed at the proper points in the water. After a sufficient length of time has elapsed, or when he has reason to believe that one or more catches have been made, he turns the crank-handle in the opposite direction and brings said drop-lines successively inward to the shore and removes the fishes from the hooks. The lines are of course detached successively as they approach the stake, so as to not interfere with the winding operation of the pulley, as it is obvious that the drop-lines could not be wound thereon without injury to themselves or to the bridge-line. After the fishes are all removed the drop-lines are successively attached and fed outward to their proper positions.

It is obvious, of course, that this apparatus may be used for trolling purposes by turning the crank at the proper speed.

When through fishing, it is only necessary to wind the bridge-line in the proper direction and remove the drop-lines successively as they reach the shore, then disengage one of the snap-hooks from one of the double-eye links, and, attaching one end of the line to a suitable reel or drum, (not shown,) wind it thereon quickly and easily.

From the above description it is obvious that I have produced a fishing apparatus whereby many drop-lines may be controlled and operated by a single attendant, and which also is simple, strong, and inexpensive of manufacture. It will be observed, too, that by arranging the pulleys horizontally instead of vertically the capacity of the line may be doubled by simply attaching a drop-line to each double-eye link, as will be readily understood. To work the line in this position successfully, however, it will be necessary to have an attendant at each end of the line to remove the drop-lines as they successively approach the pulleys. It will be understood, of course, that slight changes in the detail, construction, and arrangement of the parts may be resorted to without departing from the spirit and scope or sacrificing any of the advantages of my invention.

Having thus described the invention, what I claim as new, and desire to secure by Letters Patent, is—

1. In a fishing apparatus, an endless line, consisting of a number of sections, double-eye links connecting said sections and provided each at its middle with a pair of enlargements or flanges, drop-lines provided with the usual appurtenances, snap-hooks attached to the upper ends of said drop-lines, and loosely embracing said double-eye links between said flanges, substantially as and for the purpose set forth.

2. In a fishing apparatus, a pair of pulley-carrying stakes suitably supported, an endless line, mounted upon the pulleys carried by said stakes, and consisting of a number of sections, a corresponding number of snap-hooks carried by said sections, a corresponding number of double-eye links, each consisting of two sections and connecting one end of one section with the snap-hook attached to the adjacent section, and flanged collars secured together and embracing the inner ends of said double-eye link-sections so as to constitute a swivel connection between them, substantially as and for the purpose set forth.

In testimony whereof I affix my signature in presence of two witnesses.

JOSEPH W. LAYNE.

Witnesses:
E. W. KRUSE,
E. J. BARBERG.